Jan. 8, 1935.          J. W. LEWIS          1,986,832
DOUBLE AXLE TRAILER
Filed March 24, 1933

Inventor
JAMES W. LEWIS.
Jesse R. Stone
Lester B. Clark
Attorneys.

Patented Jan. 8, 1935

1,986,832

UNITED STATES PATENT OFFICE 1,986,832

DOUBLE AXLE TRAILER

James W. Lewis, Lufkin, Tex., assignor to Martin Wagon Company, Lufkin, Tex., a corporation Application March 24, 1933, Serial No. 662,563

2 Claims. (Cl. 280—80)

The invention relates to an improvement in double axle trailers, and particularly of the type which is adapted for heavy duty.

In heavy duty double axle trailers, it is often desirable to make more or less sharp turns, and particularly so when the travel is not upon surfaced highways. With trailers which have been constructed in the past, the front and rear axle were rigid with respect to each other so that when a sharp turn was to be made it was necessary to skid some of the wheels upon the surface in order to make a sharp turn. Obviously such practice is objectionable, and it is one of the objects of the present invention to provide a double axle trailer which may be adapted to execute more or less sharp turns and at the same time to be adapted for rigid construction so that it may travel at a high rate of speed on straight highways.

It is one of the objects of the invention to provide a double axle trailer wherein the front axle may be connected either rigidly or movably with respect to the rear axle.

Another object of the invention is to provide a double axle trailer with a radius rod construction and in combination therewith a flexible connection to either restrict or release the turning movement of the front axle.

Another object of the invention is to provide a connection for the front and rear axle of a double axle trailer so that the front axle may perform some turning movement in respect to the rear axle.

Other and further objects of the invention will be readily apparent when the following description is considered in connection with the accompanying drawing wherein.

The present invention is particularly adapted for use in connection with heavy trucking and hauling where it is desired to distribute the load upon as many tires or points of contact with the surface as possible. First, to distribute the load to obtain an enlarged traction surface, and, second, to avoid placing an excessive weight upon any one tire. It is to be understood that vehicles made up in accordance with the invention may be equipped with either single or dual tires in order to distribute the weight. It is contemplated that vehicles or trailers of the type here shown may be connected in pairs by suitable couplings so that enormous loads may be carried upon such pairs of trailers.

Figure 1:
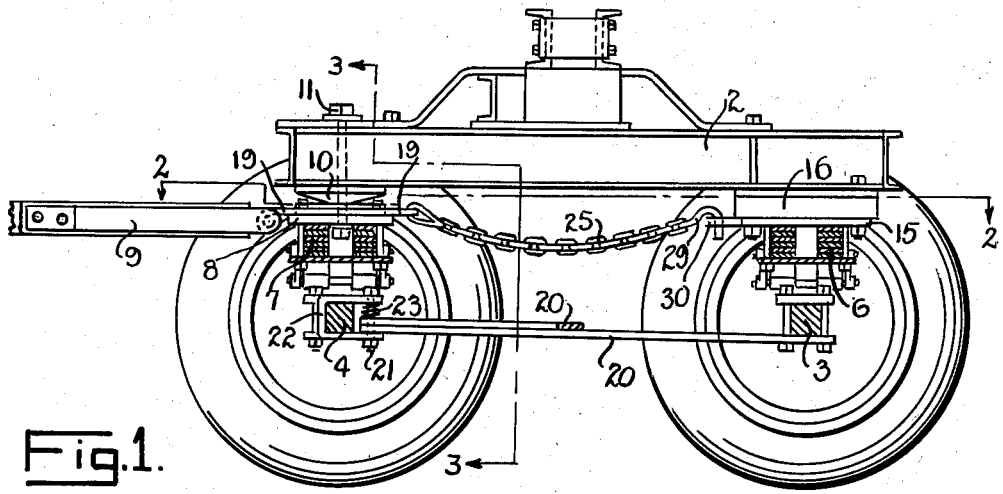
Fig. 1 is a central, vertical, sectional view of the axles and supporting structure taken on the line 1—1 of Fig. 3.

With this in mind, the invention has been illustrated in Fig. 1 as embodying the frame 2 which is mounted upon an undercarriage which comprises the rear axle 3 and the front axle 4. These axles may be of any desired shape or configuration, and serve to support the springs upon which the frame 2 is mounted. The rear spring is indicated at 6 and the front spring at 7. Connected to the top of the front spring is the lower section 8 of the fifth wheel to which the tongue or pull coupling 9 is connected. This fifth wheel 8 is rigidly mounted upon the spring 7 and is best seen as an enlarged plate or bolster in Fig. 2.

Surmounting the lower portion 8 of the fifth wheel is the upper portion of the fifth wheel or rocking bolster 10. This rocking bolster 10 is rigidly connected to the frame 2 or any other type of bolster or cross post may be attached to this member 10. The king pin 11 is shown as passing through the frame 2 and the fifth wheel plates 10 and 8 so that the axle 4 through the spring 7 is rotatable with respect to the frame 2. The rear axle 3 carries the spring 6 and the cross piece or bolster 15 is fixed to the upper part of the spring. On this plate 15 is a suitable block or support 16 upon which the frame 2 is directly mounted, it being contemplated that this block 16 will serve to level the frame 2 and suitably support the same. The block is best seen in plan elevation in Fig. 2.

Figure 2:
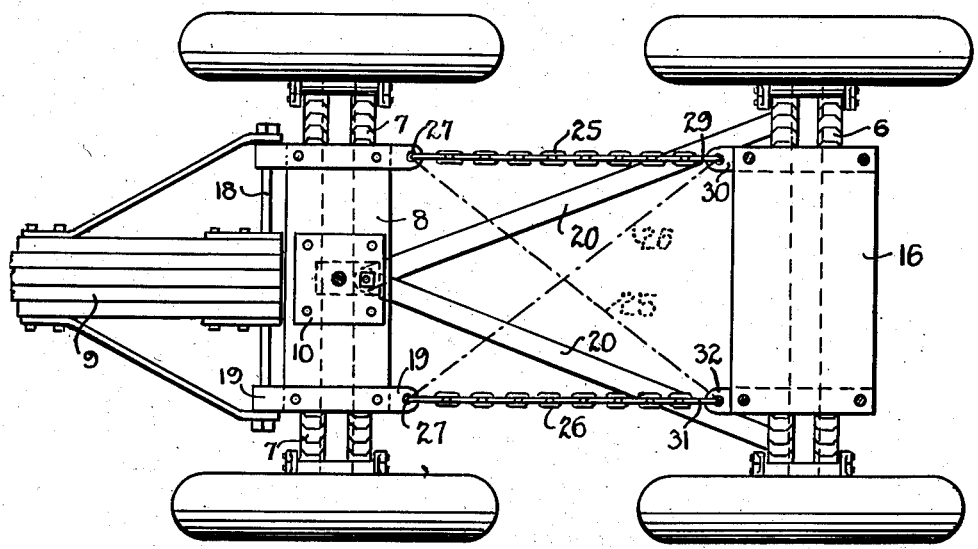
Fig. 2 is a top plan view of the double axle trailer with the trailer frame removed, and showing the arrangement of the under-carriage, this section being taken on the line 2—2 of Fig. 1.
Figure 3:
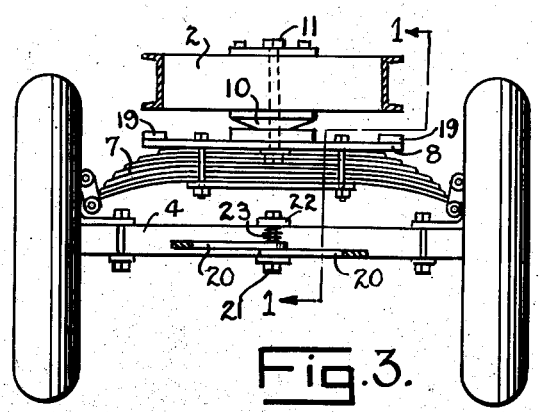
Fig. 3 is a section looking at the front axle from the rear and taken on the line 3—3 of Fig. 1.

The coupling or pull bar 9 is pivoted to the lower fifth wheel 8 by means of the rod 18 which is suitably supported within the connecting arms 19 in any desired manner. These arms 19 are preferably fixed upon the fifth wheel as best seen in Fig. 2. The upper fifth wheel or member 10 is beveled off on its lower side to allow tilting with the axle on its lower frame. It seems readily apparent that when a pull is exerted on the coupling 9, the tendency will be for the front axle 4 to pull away from the rear axle 3. To absorb this pull, the radius rods 20 have been provided. Two of these rods are illustrated as being connected to the rear axle 3 at spaced points adjacent the outer ends of the axle. The forward ends of the rods converge and are both mounted upon the bolt 21 which is carried by a clevis 22 passed around the front axle. The bolt 21 carries a spring 23 which bears against the upper surface of the radius rods in order to hold them in position but still permit a limited movement to absorb vibration. The clevis 22 is preferably fixed to the front axle 4 at the middle thereof.

These radius rods space the front and rear axles with regard to distance, but will permit turning movement of the front axle with respect to the rear axle.

In order to limit the turning movement of the front axle with respect to the rear axle the flexible chains or connections 25 and 26 have been provided, one on each side of the longitudinal center of the trailer. As best seen in Fig. 2, the arms 19 extend rearwardly from the fifth wheel plate 8, and are provided with openings 27 which receive the link or connection attached to the end of the chains or flexible members 25 and 26. The rear end of each of the flexible members 25 and 26 is connected to the under-carriage, the hook 29 on the member 25 being connected to the lug 30, and the hook 31 on the member 26 being connected to the lug 32. As noted in Fig. 1, these flexible elements 25 and 26 are more or less loose when positioned as seen in Fig. 2, so that they will permit limited turning movement of the front axle with respect to the rear axle. They do, however, limit this turning movement so that the wheels or tires on the front axle can not contact the frame 2.

With the parts in the position just described, a very efficient operation of the double axle trailer can be had in locations where sharp turns are to be executed.

When, however, the trailer moves on to a hard surfaced highway where the rate of travel is to be increased and no sharp turns are contemplated, it is desirable to hook the front and rear axles in a more or less rigid manner. This is necessary to avoid shimmying of the trailer when it travels at high speed. To accomplish this, it is only necessary to uncouple the hook 29 from the lug 30, and connect this hook 29 to the lug 32, at the same time connecting the hook 31 on the chain 26 to the lug 30, so that the flexible members 25 and 26 assume the dotted line position of Fig. 2. It seems obvious that in as much as the flexible element remains at a constant length that the slack will in this manner be taken up by crossing the members so that the front axle will now be restricted against any turning movement. This alteration of the chains 25 and 26 is a very simple operation, but it has been found that it results in stabilizing the trailer as a whole and avoids any shimmying when the trailer is traveling at a high rate of speed. The construction and arrangement of the radius rods 20 permits this arrangement of the flexible members so that the front axle may be either rigidly connected or released from turning movement.

While one form of the invention has been shown and described, it is to be distinctly understood that the same may assume various modifications and forms such as fall within the scope of the appended claims.

Having described my invention, what I claim is:
1. A double axle trailer comprising front and rear axles, a frame thereon, a king pin connection between said frame and said front axle, means to fix said frame to said rear axle, a radius rod connection between said front and rear axles and disposed below said axles so that said front axle may have turning movement, and means to limit the turning of said front axle.

2. A double axle trailer comprising front and rear axles, a frame thereon, a king pin connection between said frame and said front axle, a radius rod connection between said front and rear axles so that said front axle may have turning movement, and means connecting said front and rear axles to limit the turning of said front axle, said means also being adapted for crossed connection to prevent turning of said front axle.

JAMES W. LEWIS.